United States Patent [19]

Bernard et al.

[11] Patent Number: 4,566,328

[45] Date of Patent: Jan. 28, 1986

[54] ELECTROSTATIC-SUSPENSION ACCELEROMETERS

[75] Inventors: Alain M. Bernard, Fresnes; Georges-Marie J. Le Clerc, Arpajon; Bernard M. Foulon, Neuilly, all of France

[73] Assignee: Office National d'Etudes et de Recherche Aerospatiales (ONERA), France

[21] Appl. No.: 602,466

[22] Filed: Apr. 20, 1984

[30] Foreign Application Priority Data

Apr. 21, 1983 [FR] France .............................. 83 06528

[51] Int. Cl.[4] ..................... G01P 15/125; G01P 15/13
[52] U.S. Cl. ................................................. 73/517 B
[58] Field of Search ............... 73/516 R, 517 R, 517 B

[56] References Cited

U.S. PATENT DOCUMENTS

| 3,272,016 | 9/1966 | Mullins, Jr. | 73/517 B |
|---|---|---|---|
| 3,680,392 | 8/1972 | Hoffman | 73/517 B |
| 4,393,710 | 7/1983 | Bernard et al. | 73/517 B |

Primary Examiner—S. Clement Swisher
Attorney, Agent, or Firm—Lowe, King, Price & Becker

[57] ABSTRACT

Electrostatic triaxial accelerometer comprising a test weight movable with respect to an accelerometer body, electrically connected to said body by a highly flexible lead, electrodes fixed to said body and forming capacitors with respect to the test weight, means for detecting the test weight position by means of measurement voltages fed to said electrodes and means for positioning said test weight by electrostatic forces developed from cueing voltages applied to said electrodes, characterized in that the test weight comprises six planar plates regularly assembled such that the inside volume defined by these plates is a cube with a side smaller in length than the plates.

6 Claims, 8 Drawing Figures

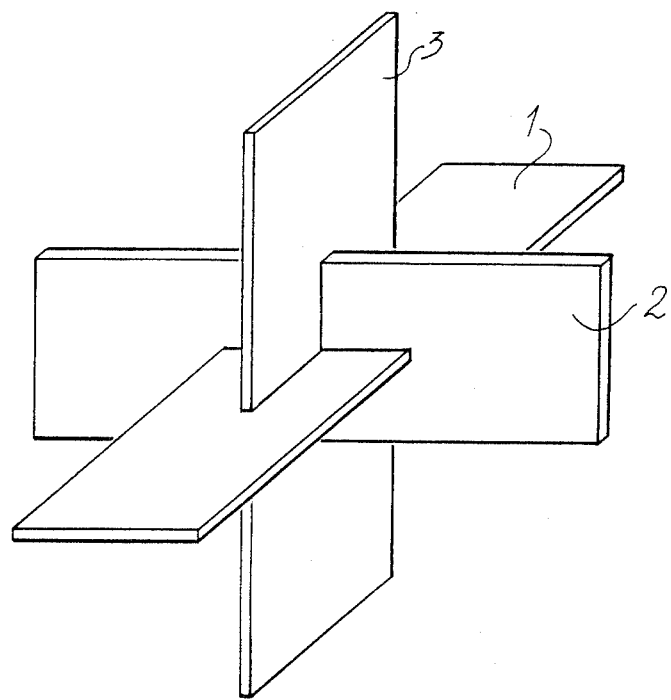
FIG.1 "PRIOR ART"
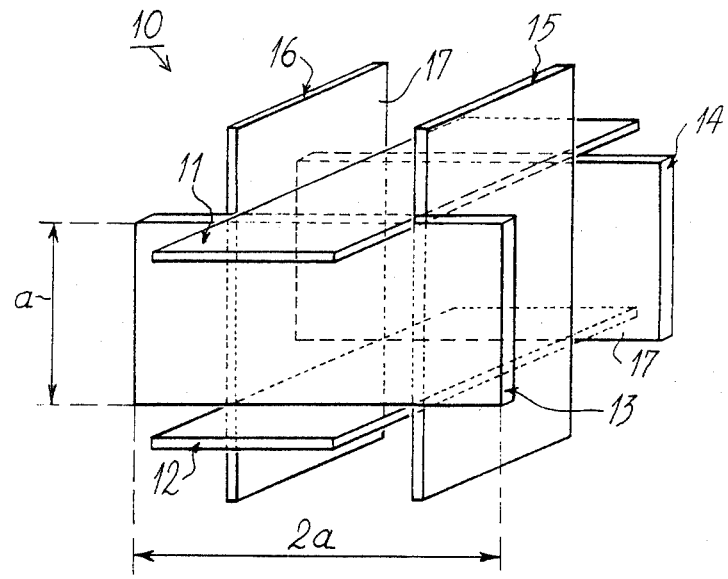
FIG.2

ELECTROSTATIC-SUSPENSION ACCELEROMETERS

BACKGROUND OF THE INVENTION

1. Field of the Invention

This invention relates to accelerometers in which the acceleration value is deduced from that of the forces required to hold a test weight in or bring it back to a position defined with respect to the body of the apparatus. It concerns more particularly accelerometers in which these forces are electrostatic in nature.

An accelerometer of this type is known in Published French patent application No. FR-A-2511509 of Dec. 31, 1980 in which the test weight is cruciform in shape and is formed of three planar rectangular plates wherein the planes are orthogonally arranged two by two.

2. Description of the Prior Art

Described in U.S. Pat. application Ser. No. 584,405 filed Feb. 28, 1984 is a test weight comprising members of planar surfaces, oppositely arranged in parallel two by two, thereby forming three pairs of surface members, where the directions normal to these members correspond to the sensitive axes of the triaxial accelerometer. In the patent application, the typical shape envisioned for the test weight is a cube.

This invention deals essentially with the shape of the test weight and the definition of the suspension electrode systems for an inertial navigation electrostatic accelerometer in which the test weight must carry a high surface to weight ratio.

An object of this invention is to simplify the design of the accelerometer through a reduction in the number of components used therein and a simplification of the shapes thereof.

A further object hereof is to improve rigidity of the test weight without increasing the weight while retaining a sizeable surface area and thereby secure better decoupling between the natural vibration modes of the test weight and those of the electrostatic suspension.

A further object hereof is to utilize systems of deposited planar electrodes (which besides simplifying the design, permits accurate electrode positioning with respect to the test weight).

A further object hereof is to curtail the thermal sensitivity of the accelerometer through the use of suitable shims for electrode positioning.

SUMMARY OF THE INVENTION

In this invention, the test weight consists of six slimline plates the lengths of which are twice the width a thereof. These six plates are assembled such that they form a cube with edge a. Each of the plates protrudes on either side of the central cube by an amount equal to a/2.

The plates can be made of either light metallic materials (aluminium alloys, beryllium, magnesium, titanium) or metal-plated insulants (silica, ceramics). Use may be made of a hollow cube cut-out so as to keep just the edges in order to ease assembly of the plates either by bonding or by welding or brazing.

BRIEF DESCTRIPTION OF THE DRAWINGS

A detailed description of the invention will now be given in reference to the appended drawings in which:

FIG. 1 depicts the test weight of an accelerometer based on former art;

FIG. 2 depicts the test weight of an accelerometer as in this invention;

DESCRIPTION OF THE PREFERRED EMBODIMENTS

Figure 3:
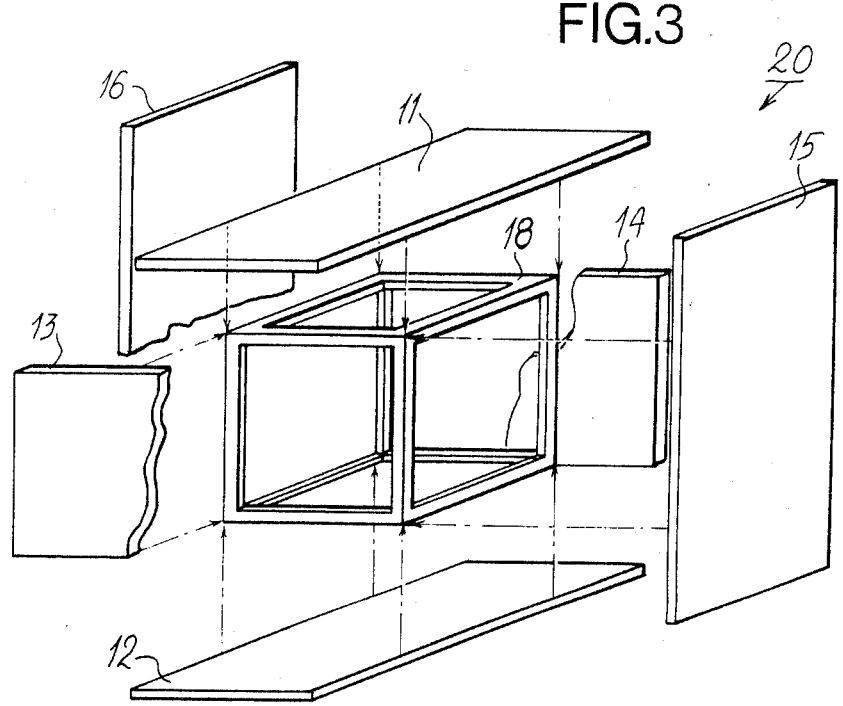
FIG. 3 depicts another test weight in keeping with the invention mounted about a core shaped like a cubic framework.

With reference to FIG. 1, the test weight as in the former art comprises three identical planar plates 1, 2 and 3 assembled such that the planes of the plates are orthogonally arranged two by two.

Represented in FIG. 2 is test weight 10 as in the invention. It comprises not three plates but six plates 11 to 16, forming three pairs of parallel plates separated from each other in each pair 11 and 12, 13 and 14, 15 and 16. The planes of pairs of plates are arranged orthogonally two by two. The assembled plates from a cube and the ends of said plates protrude from the surface of the cube thereby creating side extensions 17. The length of each extension 17 is substantially equal to half the side a of the cube.

FIG. 3 also shows plates 11–16 where they are fixed to a cubic frame 18 defined by the edges of a cube. A test weight 10 made up of 6 plates in AU4G (20×10×0.3 mm) and assembled by laser welding that weighs 1 g; a test weight 20 made up of 6 plates in silica (20×9.8×0.3 mm) and assembled by bonding on an empty cube (1×1×10 mm) has a weighs 1.5 g.

Figure 4B:
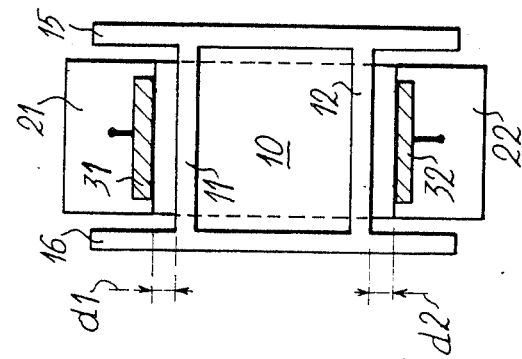
FIGS. 4a and 4b depict the test weight and the accelerometer cage as the invention.
Figure 4A:
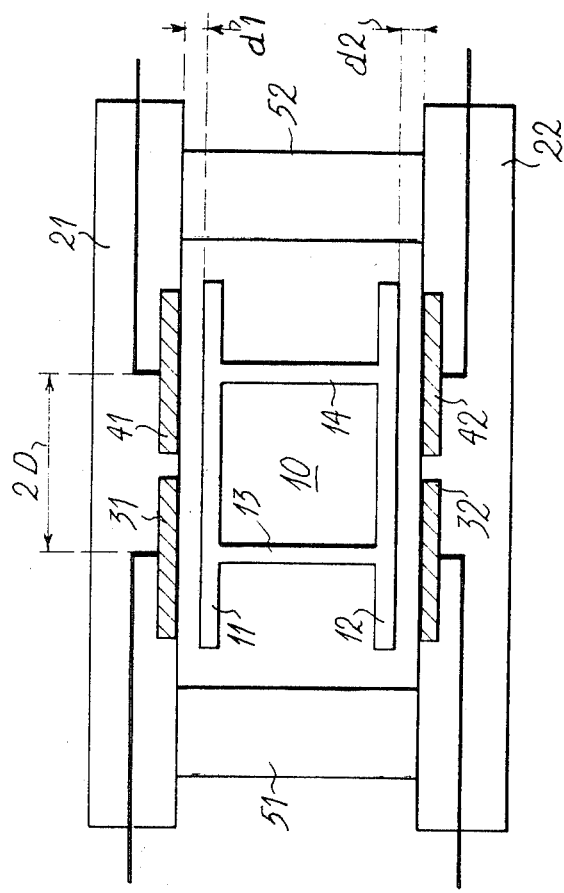

To cue the six degrees of freedom of test weight 10 or 20, 12 electrodes are required set out in 3 systems of 2 pairs of electrodes. As depicted in FIGS. 4a and 4b, each system consists of 2 plates 21 and 22 each carrying 2 electrodes 31 and 41 as regards plate 21 and 32 and 42 as regards plate 22, and 2 spacers 51 and 52 that serve as shims in order to fix the distances $d_1$ and $d_2$ between the electrodes and test weight 10 or 20.

For the test weight dimensions given above, the dimensions of the electrode carrier plates would be 45×10×5 mm and those of the shims (11×10×7 mm). These shims are made either of the same material as the test weight or a material having an identical coefficient of expanson.

Figure 5:
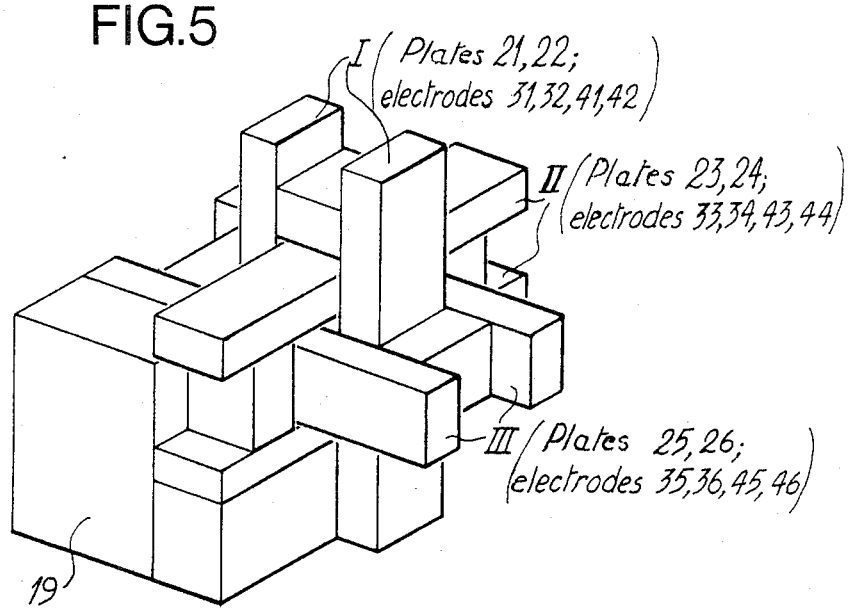
FIG. 5 depicts the accelerometer assembled.

The three systems of electrodes: I (31, 32, 41, 42), II (33, 34, 43, 44) and III (35, 36, 45, 46) lock into each other about the test weight and are positioned perpendicularly to each other by beams of a support element 19 (FIG. 5).

The assembled arrangement is placed inside a sealed housing.

Figure 6:
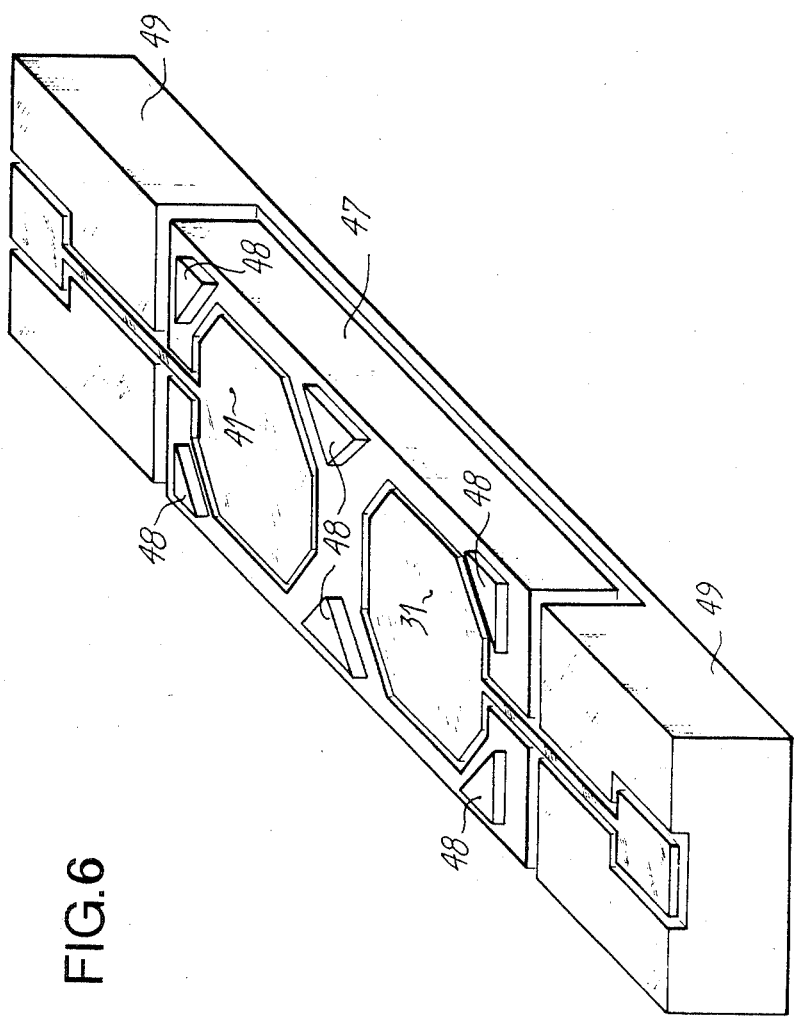
FIG. 6 depicts a plate of electrode.

The plates carrying the electrodes are made of an insulating material (silica or alumina). The various metal-plated coats to be applied correspond to:

the active electrodes (31, 41, FIG. 6) that serve both for capacitively the position and applying the electrostatic suspension forces;

surface 47 opposite the suspended weight, comprising mechanical stops 48 that prevent the test weight from coming into contact with the electrodes. Conducting surface 47 is raised to the same potential as the test weight and acts as a screen to eschew any parasite electrostatic attraction due to conducting surfaces other than the electrodes;

all other surfaces 49, with in particular on each plate, the face opposite that of the electrodes. Surfaces 49 are raised to the reference potential so as to minimize the parasitic capacity effects on the capacitive detections.

The electrode systems can be created as follows:

metal-plating is achieved by deposition in a vacuum. The electrodes and various conductors are then marked out by grooving obtained ultra-sonically in the insulant plate. Three grooves reduce the parasitic capacity between electrodes 21, 31 and metal-coated surface 47 and obviate there being any insulant surfaces in the immediate vicinity of the test weight. The very thin mechanical stops (twenty of so microns thick) are obtained by screen process printing techniques.

Figure 7:
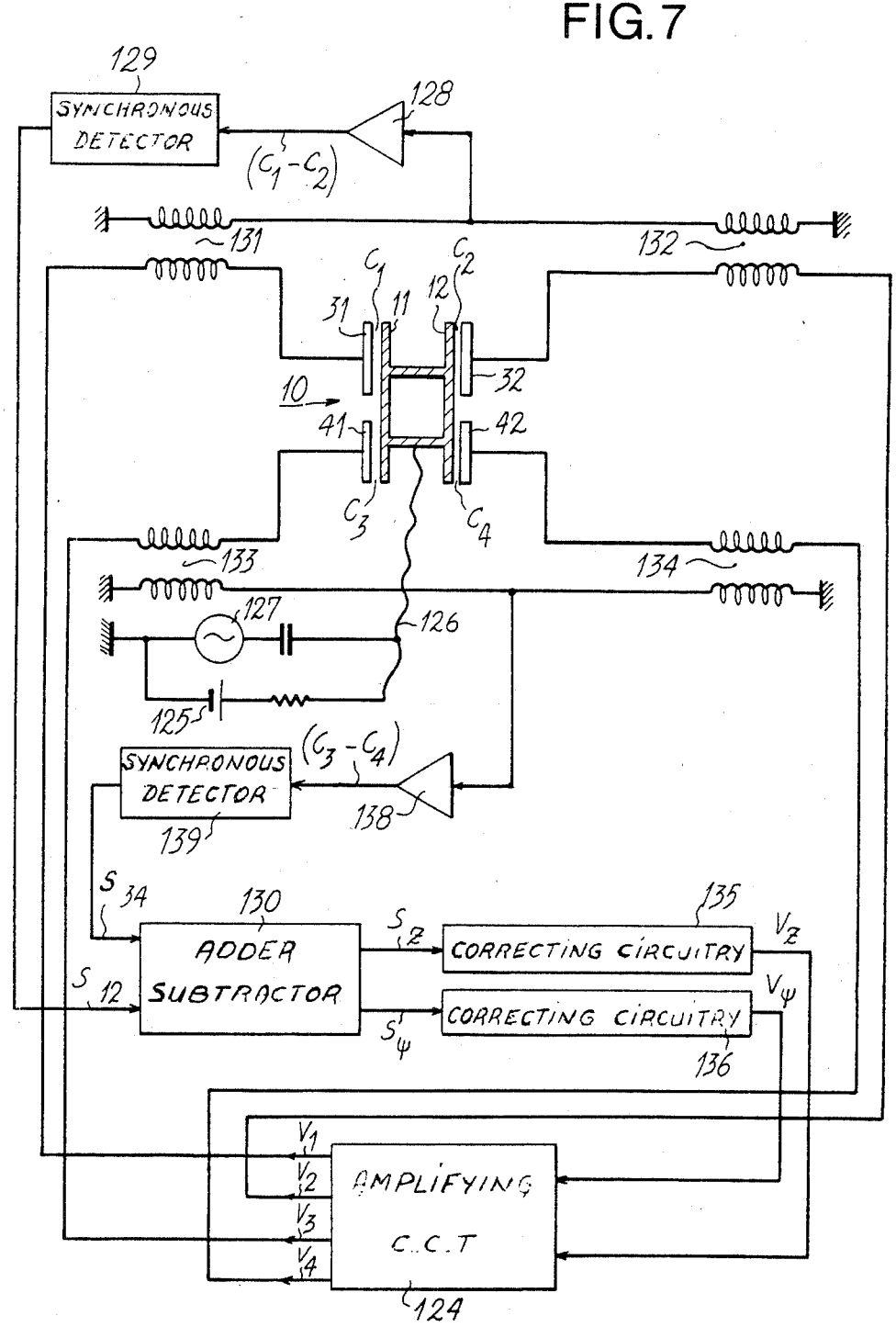
FIG. 7 depicts the wiring block diagram for the accelerometer.

A description will now be given in relation to FIG. 7 of how the accelerometer works, it being understood that the device in FIG. 7 is none other than the one in FIG. 2 against French application No. FR-A-2511509 mentioned above with modifications solely to the structure of the test weight.

FIG. 7 schematically illustrates the body of the accelerometer and test weight 10. Plates 11 and 12 can be seen, as can electrodes 31, 32, 41, 42 cooperating with said plates 11 and 12. Electrodes 31, 32, 41, 42 are raised respectively to potentials $V_1$, $V_2$, $V_3$, $V_4$ by amplifying circuits 124 through the primary windings of four transformers 131, 132, 133, 134. A dc bias voltage $V_0$ is fed to the test weight by generator 125 along a fine lead 126. By means of a generator 127, it is possible to feed an alternating voltage $V_D$ to the test weight simultaneously with polarizing voltage $V_0$ for position detection purposes.

The signals at angular frequency $\omega_D$ of the position detection voltage picked up by electrodes 31, 32, 41, 42 through capacitors $C_1$, $C_2$, $C_3$, $C_4$ are fed two by two via secondary transformers 131–134 to an amplifier followed by a synchronous detector.

The signal proportional to $(C_1 - C_2)$, obtained at the output from amplifier 128 is applied to synchronous detector 129 that receives the carrier wave with angular frequency $\omega_D$ frm generator 127. The signal proportional to $(C_3 - C_4)$, obtained at the output from amplifier 138 is applied to synchronous detector 139 that also receives the carrier wave with angular frequency $\omega_D$ from generator 127. Amplifiers 128 and 138 deliver output signals proportional to:

$(C_1-C_2) V_D$ and $(C_3-C_4) V_D$

The differential signals $S_{12}$ and $S_{34}$ supplied respectively by synchronous detectors 129 and 139 are proportional to a linear combination of test weight translaton along an axis and test weight rotation about another axis. As far as this rotation is concerned, the coefficient of proportionality relating the signal to the angle of rotation is none other than the distance 2D joining the centres of two electrodes 31 and 41 or 32 and 42. As can be seen in FIG. 4a, this distance can exceed the dimension a of the cubic framework since the electrodes can be sited partially on plate side extensions 17. This constitutes an advantage with respect to the test weight in French patent application No. 83-03257 in which with a cubuc test weight, the quantity 2D is also equal to the length a of the cube.

Adder-subtractor 130 separates the translation-related component $S_z$ and the rotation-related component S in the signals $S_{12}$ and $S_{34}$. Lastly, correcting circuitry 135 and 136 generates the cueing signals $V_1$ to $V_4$. Details are given in the published French patent application No. FR-A-2511509 to which reference should be made.

What we claim is:

1. An electrostatic triaxial accelerometer comprising:
    an accelerometer body;
    a test weight movable with respect to said accelerometer body, electrically connected thereto by a highly flexible conductor lead;
    said test weight including six planar plates regularly assembled such that the inside volume defined by said plates is a cube with a side smaller in length than the plates, said test weight thus carrying planar surface elements oppositely arranged in parallel two by two, forming three pairs of surface elements;
    electrodes fixed to said body and forming capacitors with respect to said test weight surface elements;
    means for detecting the test weight position by means of measurement voltages fed to said electrodes;
    means for positioning said test weight by electrostatic forces developed from cueing voltages fed to said electrodes;
    whereby this arrangement makes it possible to secure a high surface to weight ratio for the test weight needed for the electrostatic suspension.

2. Accelerometer as set forth in claim 1, wherein the plates are attached to a cubic framework, said plates extending beyond the cube sides such that their ends form extension parts.

3. Accelerometer as set forth in claim 2, wherein the length of the cubic frame edge is a and the plates are 2 a long such that the extension parts jutting out from the framework have a length of a/2.

4. Accelerometer as set forth in claim 1, wherein the electrodes have equal surface areas and are twelve in number divided into three groups of two pairs, the electrodes in one group being perpendicular to the corresponding sensitive axis, the electrodes of one pair being coplanar and lying opposite the electrodes of the other pair, each pair of electrodes being obtained by metal-plating on an insulating parallelepipedal plate.

5. Accelerometer as set forth in claim 1, wherein the plates carrying the electrodes are positioned about the test weight by means of shims offering coefficients of expansion identical to that of the test weight.

6. Accelerometer as set forth in claim 2, wherein the plates carrying the electrodes are positioned about the test weight by means of shims offering coefficients of expansion identical to that of the test weight.

* * * * *